(12) United States Patent
Wang et al.

(10) Patent No.: US 7,359,889 B2
(45) Date of Patent: Apr. 15, 2008

(54) METHOD AND APPARATUS FOR AUTOMATICALLY CREATING DATABASE FOR USE IN AUTOMATED MEDIA RECOGNITION SYSTEM

(75) Inventors: Avery Li-Chun Wang, Palo Alto, CA (US); Philip Inghelbrecht, London (GB); Christopher Jacques Penrose Barton, San Diego, CA (US); Dheeraj Shankar Mukherjee, London (GB)

(73) Assignee: Landmark Digital Services LLC, Nashville, TN (US)

( * ) Notice: Subject to any disclaimer, the term of this patent is extended or adjusted under 35 U.S.C. 154(b) by 413 days.

(21) Appl. No.: 10/087,204

(22) Filed: Mar. 1, 2002

(65) Prior Publication Data

US 2002/0161741 A1  Oct. 31, 2002

Related U.S. Application Data

(60) Provisional application No. 60/273,146, filed on Mar. 2, 2001.

(51) Int. Cl.
    *G06F 17/30* (2006.01)
(52) U.S. Cl. .......................................... 707/1
(58) Field of Classification Search ................. 707/3, 707/10, 104.1, 2, 205, 1; 709/231, 219; 704/270; 715/763
    See application file for complete search history.

(56) References Cited

U.S. PATENT DOCUMENTS

| | | | |
|---|---|---|---|
| 4,230,990 A | 10/1980 | Lert, Jr. et al. | ................ 455/67 |
| 4,450,531 A | 5/1984 | Kenyon et al. | ............. 364/604 |
| 4,739,398 A | 4/1988 | Thomas et al. | ................ 358/84 |
| 4,843,562 A | 6/1989 | Kenyon et al. | ............. 364/487 |
| 4,918,730 A | 4/1990 | Schulze | ........................ 381/43 |
| 5,134,719 A | 7/1992 | Mankovitz | ............... 455/154.1 |
| 5,210,820 A | 5/1993 | Kenyon | .......................... 395/2 |
| 5,437,050 A | 7/1995 | Lamb et al. | .................... 455/2 |
| 5,574,962 A | 11/1996 | Fardeau et al. | ................. 455/2 |
| 5,577,249 A | 11/1996 | Califano | ..................... 395/611 |
| 5,581,658 A | 12/1996 | O'Hagan et al. | ............. 395/22 |

(Continued)

FOREIGN PATENT DOCUMENTS

EP   0 480 010 B1   9/1996

(Continued)

*Primary Examiner*—Etienne P. LeRoux
(74) *Attorney, Agent, or Firm*—Fulbright & Jaworski LLP (57) ABSTRACT

A method for automatically creating a database of parameters (e.g., fingerprints/landmarks) used in a media sample recognition system. The user places a media sample in his media player, e.g., a CD or DVD player in his personal computer. A software process installed on the user's personal computer, to which is connected the CD/DVD player, extracts the constellation or "raw parameters" from the CD tracks as the CD plays, or under control of the software process. This extraction process may operate in the background. These raw parameters are then transmitted via the Internet (or other computer network) to a server coupled to a recognition database. The raw parameters are stored in the database. At some point in time, the raw parameters are processed into fingerprint/landmarks (e.g., using linkage) using another software process and then stored either back in the database or in random access memory (RAM) for use during a subsequent recognition process. The media sample can also be simultaneously identified during playback, which identity information is then sent to the server coupled to the recognition database.

33 Claims, 3 Drawing Sheets

U.S. PATENT DOCUMENTS

| | | | |
|---|---|---|---|
| 5,581,800 A | 12/1996 | Fardeau et al. | 455/2 |
| 5,787,334 A | 7/1998 | Fardeau et al. | 455/2 |
| 5,829,004 A * | 10/1998 | Au | 707/100 |
| 5,842,162 A | 11/1998 | Fineberg | 704/223 |
| 5,918,223 A | 6/1999 | Blum et al. | 707/1 |
| 5,987,525 A | 11/1999 | Roberts et al. | 709/248 |
| 5,991,737 A | 11/1999 | Chen | 705/26 |
| 6,061,680 A * | 5/2000 | Scherf et al. | 707/3 |
| 6,128,625 A * | 10/2000 | Yankowski | 707/104.1 |
| 6,154,773 A | 11/2000 | Roberts et al. | 709/219 |
| 6,161,132 A | 12/2000 | Roberts et al. | 709/219 |
| 6,292,185 B1 * | 9/2001 | Ko et al. | 715/763 |
| 6,505,160 B1 * | 1/2003 | Levy et al. | 704/270 |
| 6,549,922 B1 * | 4/2003 | Srivastava et al. | 707/205 |
| 6,819,721 B1 * | 11/2004 | Kobayashi et al. | 375/298 |
| 6,941,275 B1 | 9/2005 | Swierczek | |
| 7,174,293 B2 | 2/2007 | Kenyon et al. | |
| 7,194,752 B1 | 3/2007 | Kenyon et al. | |

FOREIGN PATENT DOCUMENTS

| | | |
|---|---|---|
| EP | 0 982 578 A2 | 3/2000 |
| WO | WO93/07689 | 4/1993 |
| WO | WO93/22875 | 11/1993 |
| WO | WO94/00842 | 1/1994 |
| WO | WO97/33273 | 9/1997 |
| WO | WO97/40491 | 10/1997 |
| WO | WO99/48099 | 9/1999 |
| WO | WO91/17540 | 11/1999 |

* cited by examiner

METHOD AND APPARATUS FOR AUTOMATICALLY CREATING DATABASE FOR USE IN AUTOMATED MEDIA RECOGNITION SYSTEM

RELATED APPLICATIONS

This application claims the benefit of U.S. Provisional Patent Application No. 60/273,146, filed Mar. 2, 2001 with the same title and by the same inventors and assigned to the same Assignee.

This application is related to U.S. patent applications Ser. Nos. 09/671,571 entitled "Method and System for Purchasing Pre-Recorded Music" filed on Sep. 27, 2000 by the same inventors; and 09/734,949 entitled "Method and System for Interacting with a User in an Experiential Environment" filed on Dec. 12, 2000 by the same inventors. This application is also related to U.S. Provisional Patent Application No. 60/222,023 entitled "Method and System for Recognizing Sound and Music Signals in High Noise and Distortion" filed on Jul. 31, 2000 also by some of the same inventors. Each of these patent applications is hereby incorporated by reference as if repeated herein in its entirety, including the drawings.

COPYRIGHT NOTICE

A portion of the disclosure of this patent document contains material that may be subject to copyright protection. The copyright owner has no objection to the facsimile reproduction of the patent document or the patent disclosure, as it appears in the U.S. Patent & Trademark Office patent file or records, but otherwise reserves all copyright rights whatsoever.

BACKGROUND OF THE INVENTION

The present invention relates generally to methods and apparatuses for automatically identifying media, or content, samples, and more particularly to a method and apparatus for automatically identifying a media, or content, sample based on a database of known media files by comparing certain aspects of the media sample to similarly obtained aspects of the known media files.

The related applications disclosed various methods and apparatuses for identifying media samples, and applications for such identification. At the heart of these methods and apparatuses is a database of known media files. Creating the database is an expensive proposition. Buying a single copy of all known media files and all new ones as they are created while effective is probably cost prohibitive. Simply making copies of media files while also effective may in certain instances violate copyright laws in some countries. Moreover, the uncertainty of whether certain acts do in fact violate copyright laws coupled with the fact that copyright laws vary, sometimes significantly, from country to country, makes it difficult to invest in and/or implement a system or method that relies upon use of unlicensed media.

The present invention is therefore directed to the problem of developing a method and apparatus for automatically creating a database of known media files at low cost and without violating any copyright laws.

SUMMARY OF THE INVENTION

The present invention solves these and other problems by providing method and apparatus for interacting with an on-line community providing access to a large number of media files and a database of metadata related to the media files available from its users to process segmented portions of each media file to create additional metadata that can be subsequently used to create constellations and fingerprints for each media file for use in the recognition algorithm to be employed. By creating processed metadata from each file that can be then stored for use in a recognition database or further processed, for use in the algorithm being actually employed by the recognition process at a later date, the present invention probably avoids violating copyright protections, as the processed metadata may not be protectable and as no copy of the original file is created, even temporarily, in the process of the present invention. Thus, the present invention enables an automatic and inexpensive technique for creating the necessary database for use in the media recognition systems set forth in the above-mentioned U.S. Patent Applications.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides an automatic technique for creating a database of media, or content, files against which media, or content, samples are compared to identify the media samples. An exemplary embodiment of the present invention uses an existing system indirectly accessed via an existing company. An exemplary service, www.CDDB.com actually operates in the "background"—people who insert a CD in their PC usually do it through third parties, such as MusicMatch or Winamp. This service (www.cddb.com) is also known as Gracenote, which has a large community of users, to harvest fingerprints, i.e., processed metadata. The user interface to Gracenote may occur through a third party, such as MusicMatch.com. For the sake of simplicity herein, we will leave out the indirect relationship between the user community and Gracenote.

Currently, Gracenote has over 1,000 licensees in 35 countries, 20 million unique users a month, and more than 800,000 albums and 10 million songs in its database; hence, Gracenote is a comprehensive and widely accessible platform for delivering worldwide music related content and services. Gracenote is a service paid for by the third party explained above, by and for music fans to identify the music they play. Gracenote's Content Delivery Engine provides the ability to aggregate and deliver rich third-party content that is directly related to music as it is playing. Gracenote's CDKey technology verifies possession of a particular CD and uses it as a key to enable web-based applications, such as music lockers or music service providers. This CDKey technology can even unlock bonus content from any location, including Gracenote-enabled applications, such as media players or websites.

Several patents describe this service in particular detail, including U.S. Pat. No. 5,987,525 and U.S. Pat. No. 6,154,773, which relate to features including synchronizing visual content with playback of a musical recording at a local computer that receives the visual content from a remote computer. U.S. Pat. No. 6,061,680 relates to a method used to find title and track information in a database by calculating approximate length information based on the number and length of tracks on a recording. U.S. Pat. No. 6,161,132 relates to a method of using a first device to control playback of a recording at one or more second devices connected to the first device via a network and transmitting output data related to the recording between the first and second devices. Each of the above four patents is hereby incorporated by reference as if repeated herein in their entirety, including the drawings.

Users of this service via the above mentioned website are able to obtain metadata from the website based on inserting a CD into a CD player, which then uploads certain information to the server, in particular the number of tracks and associated track lengths. This metadata is then used to identify the particular media and then extract other related metadata from the server related to the identified media, such as artist, genre, etc.

By using this service, the present invention permits building of the necessary database to supplement content derived from directly ripping parameters from media owned by the system.

According to an exemplary embodiment for use with Compact Disks (CDs), when a user of the CDDB website inserts a CD into a CD player hooked up to a data archiving service, constellation or fingerprint parameters are extracted from the tracks on the CD and then sent to the data archiving service. The raw parameter data may then be further processed, either immediately or at some later time (including after a prolonged storage) into landmark/fingerprint pairs for storage in the recognition database. The raw parameter data may be optionally stored in case a new revision of the algorithm for enhanced recognition is available. The enhanced recognition algorithm could use the stored raw parameter data to generate new enhanced fingerprints, whereby access to the original source of raw data (i.e., the original CD) is not necessary for minor algorithm updates (e.g., linkage updates).

In the case of songs or media not already in the database, another aspect of the invention provides for this, which aspect also takes care of major algorithm updates as well. Rather than extracting the parameters each time and forwarding them, the remote client first queries the database to determine if the song already exists in the database. If not, then the remote client extracts and forwards the necessary parameters. If the song is already in the database, the remote client determines if the remote client is using a version of the algorithm that is more up-to-date than the version used on the song previously stored in the database. If so, then the remote client performs the parameter extraction.

Another aspect of the present invention allows the remote client to update its algorithm to the latest version by either: (1) updating parameters controlling the extraction; or (2) downloading a code update embodying the updated parameter extraction. This process is accomplished before updating the song.

Of course, the raw parameter data being sent over should be associated with the track "metadata" information about the song in order for it to be identified. This could be accomplished by: (1) extracting identifying parameters that could be used to look up the metadata in a metadata database, such that the metadata database could be queried immediately or later. If immediately, then: (2a) the retrieved metadata is sent to the recognition server, otherwise if later: (2b) the unique ID is sent to the recognition server, whereby the database can be subsequently queried.

Hence, for example, a small piggyback program could be distributed with the CDDB SDK, so that CDDB clients could incorporate the raw parameter extraction process, so that raw parameters could be extracted when the CDDB service is used for querying. Or, an extractor could be running independently of CDDB, such that it derives the parameters for CDDB to use, but does not actually incorporate CDDB code. In the latter case, CDDB is queried after the data packet is received by the recognition database.

With this method, the database may be incrementally updated such that songs with older versions of the algorithm may be updated when a new algorithm is available, and the CD is presented by a user, allowing new raw parameters to be extracted. There is the issue that the database would have multiple raw parameter formats with algorithms of varying ages. This could be handled by segmenting the recognition landmark/fingerprint database, such that songs with the same version of parameter are grouped together. Then, an incoming song needs to be analyzed using each of the various fingerprinting algorithm versions in use. Corresponding queries into segments of the database are made with the proper fingerprint version. As updated parameters for a song trickle in, the song is bumped up into its proper version category. The updates may be forced by directly extracting parameters from songs that are immediately available, for example if the original source material is available in a readily accessible music archive. If the song is not available then the song is updated opportunistically as some user with an updated extractor presents the song to the extractor. Over time, the majority of the songs attain the most recent format.

Figure 1:
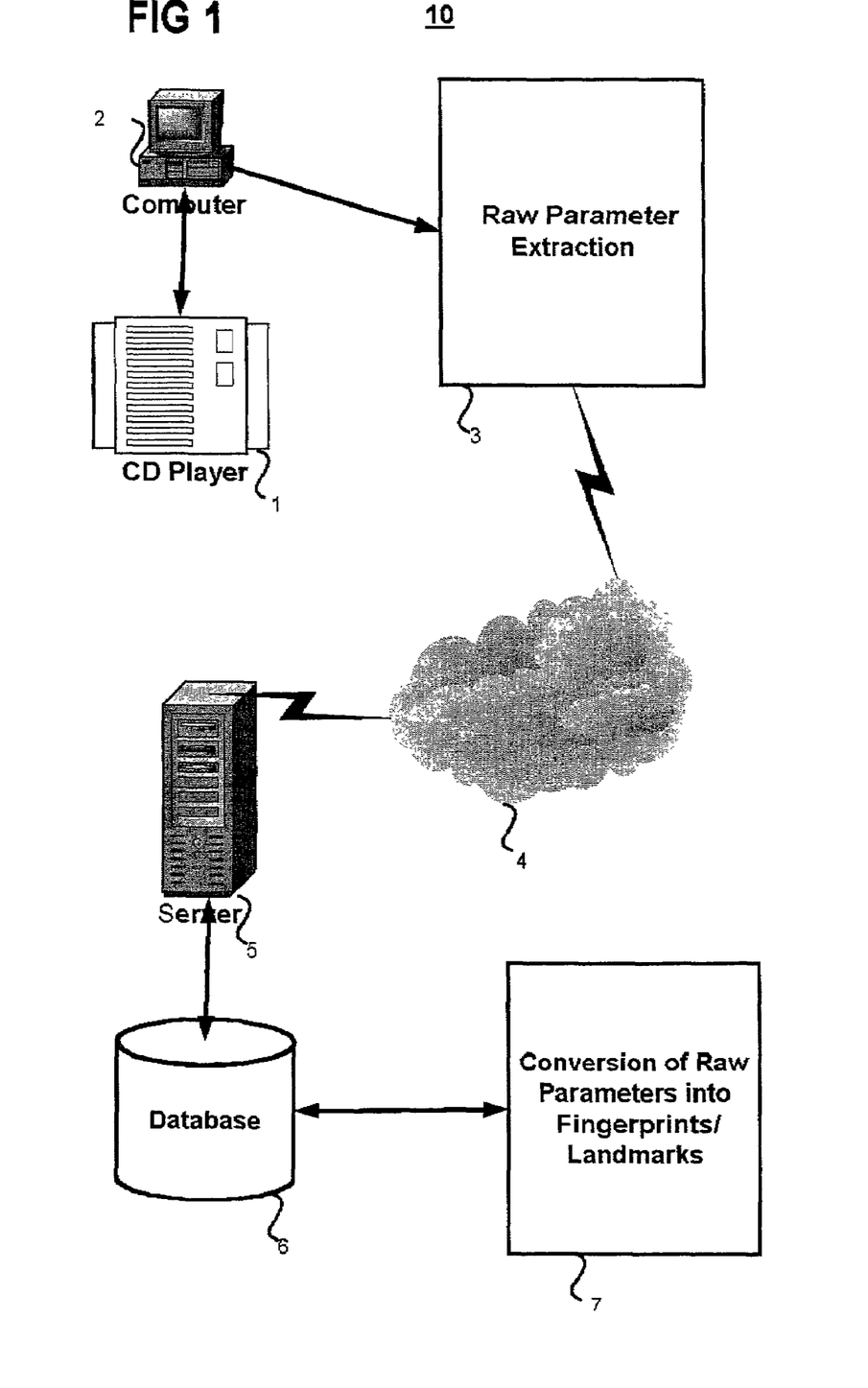
FIG. 1 shows a block diagram of an exemplary embodiment of a system according to one aspect of the present invention.

An exemplary embodiment of a process 10 according to one aspect is shown in FIG. 1 for use with audio media, such as compact disks (CDs). The user places a CD in his CD player 1. A software process 3 installed on the user's personal computer 2, to which is connected the CD player 1, extracts the constellation or "raw parameters" from the CD tracks as the CD plays, or under control of the software process. These raw parameters are then transmitted via the Internet 4 (or other computer network) to a server 5 coupled to a recognition database 6. The raw parameters are stored in the database 6. At some point in time, the raw parameters are processed into fingerprint/landmarks (e.g., using linkage) using another software process 7 and then stored either back in the database 6 or in random access memory (RAM) for use during a subsequent recognition process. This process, however, requires manual identification of the CD.

Figure 2:
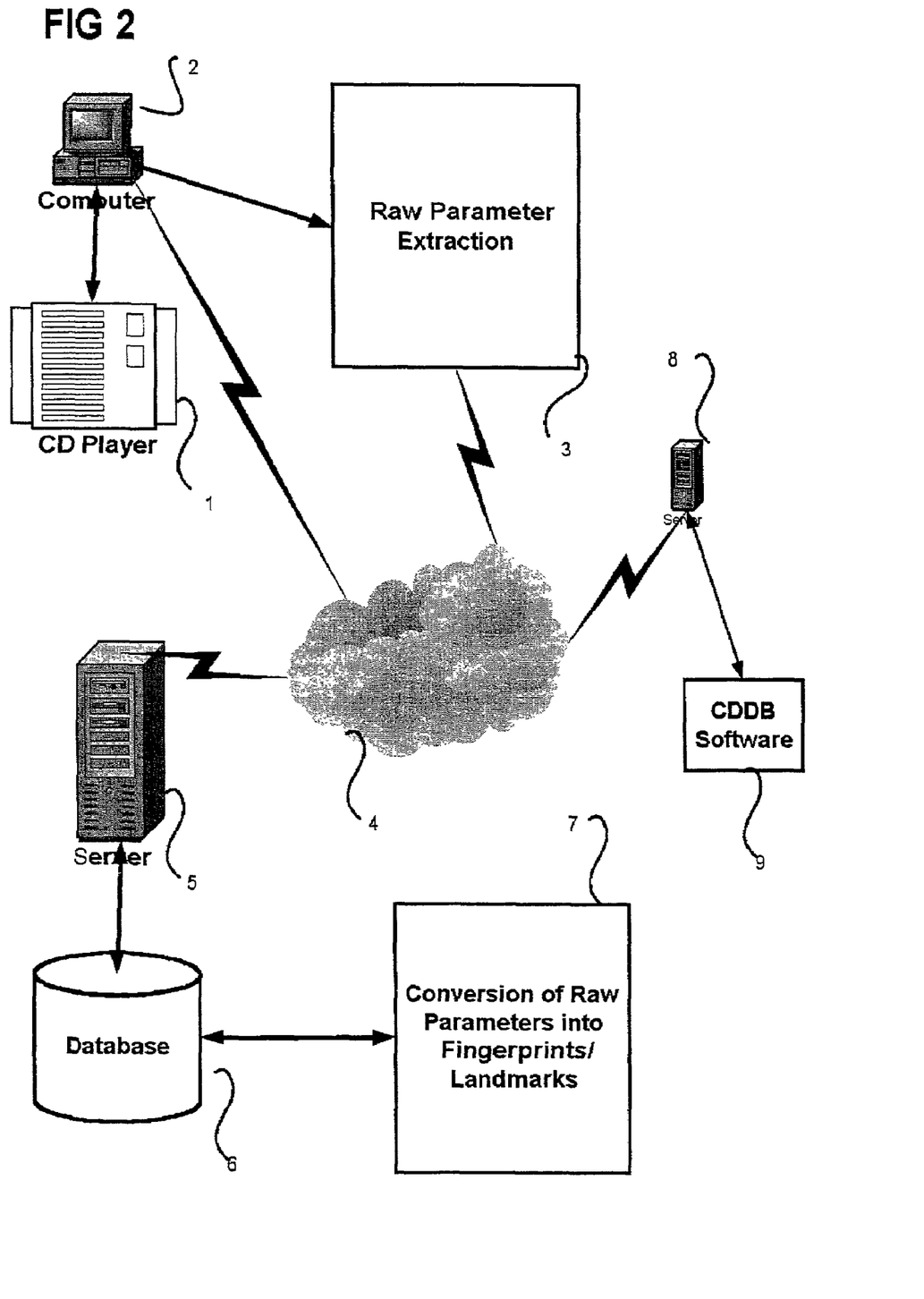
FIG. 2 shows a block diagram of a second exemplary embodiment of a system according to another aspect of the present invention.

Turning to FIG. 2, shown therein is a second exemplary embodiment of a process 20 according to another aspect of the present invention. This process 20 relies upon the identification capabilities of the Gracenote service or other similar service that can identify a CD when placed in one's CD player 1. Simultaneous to the uploading of the constellation or raw parameters to the recognition database 6, the track length and number of tracks are sent to the Gracenote server 8 for identification by the CDDB software 9 (as disclosed in the above mentioned patents), the result of which is forwarded to the recognition database 6. The result can either be returned to the user via the same path the request arrived and then uploaded at the end of the raw parameter extraction process, or forwarded directly to the recognition database 6 via the Internet 4 and server 5.

Thus, as before a user places a CD in the CD player 1. The CD is identified via the CDDB software 9. Metadata for that particular CD is provided to the recognition server 5 along with the identification for storage in the recognition database 6 in a record associated with the received constellation or raw parameters for that particular CD. As before, the constellation or "raw parameters" are extracted and transmitted to the recognition database 6 via the Internet 4. This processed metadata is then stored, and subsequently further processed into fingerprint/landmarks (e.g., using linkage). Finally, the subsequently processed metadata is stored for use by the recognition service. This process, however, may result in redundant data arriving at the recognition database 6.

Figure 3:
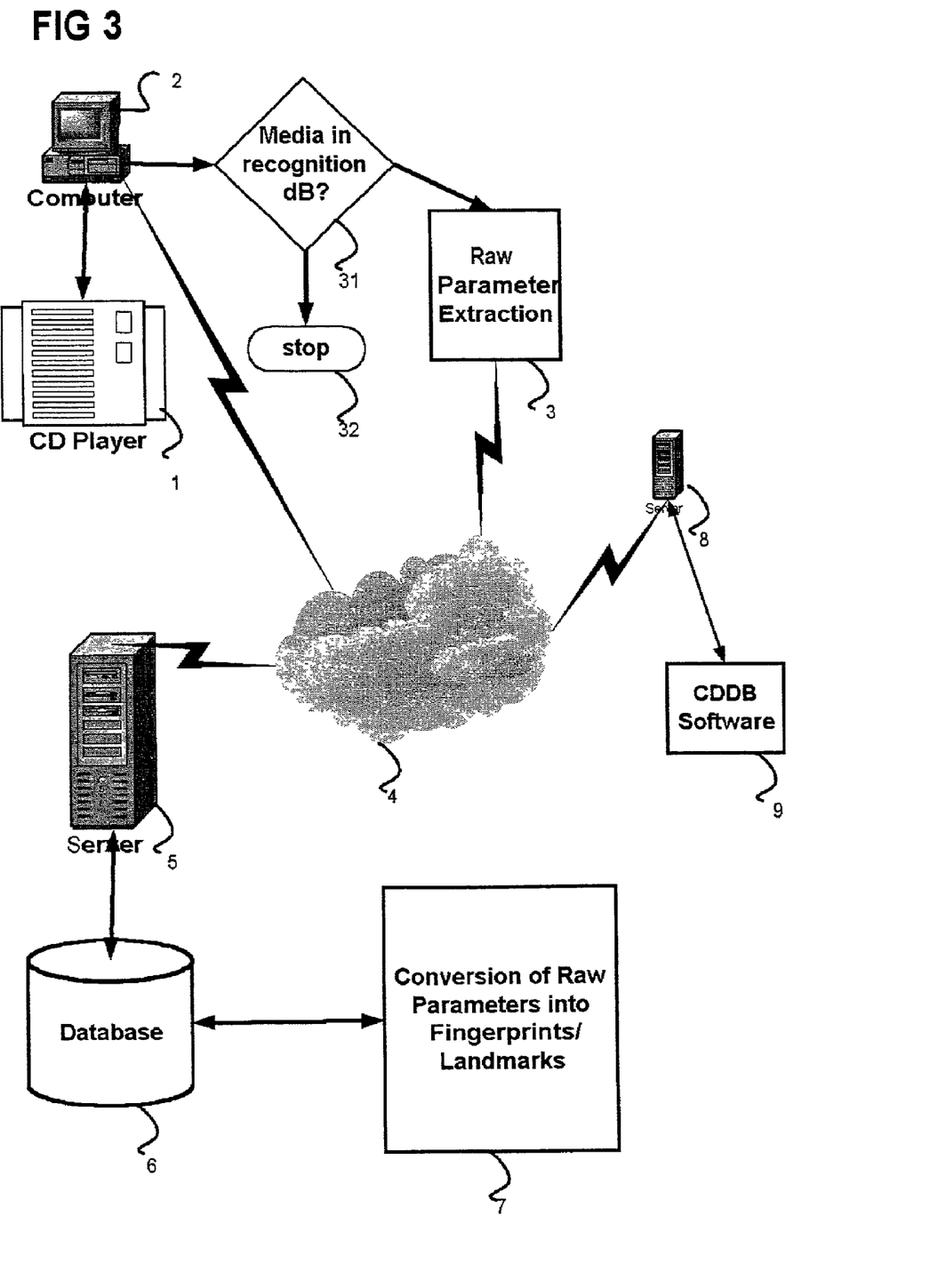
FIG. 3 shows a block diagram of a third exemplary embodiment of a system according to another aspect of the present invention.

Turning to FIG. 3, shown therein is an exemplary embodiment of another process 30 according to another aspect of the present invention. This process 30 performs a check prior to extracting the constellation or raw parameters to determine whether the recognition database 6 currently holds the latest version (i.e., the correctly processed metadata) of the CD in the user's CD player 1. If so, no further action is taken. If not, the data is uploaded in the same manner described previously.

First, the user's CD is identified 31 and then a check is performed to see if the recognition database already has the CD with the most up-to-date raw parameter format. If the recognition database already contains the most up-to-date raw parameter for the CD at issue, then no further action occurs 32. If the recognition database does not have the particular CD, then the constellation or "raw parameter" extraction process occurs. The resulting constellation or "raw parameters" (i.e., processed metadata) are then transmitted to the recognition database 6, where they are placed in storage and subsequently processed into fingerprint/landmarks (e.g. using linkage). The resulting further processed metadata is stored in RAM for use by the recognition service.

The above explanation relates primarily to extracting raw parameter data from (physical) CDs inserted in a personal computer. In a similar fashion, one could extract raw parameters using the same process-flows as described from scanning a user's hard drive or tapping into streaming music. The associated metadata would come from either "file embedded info" (e.g., ID3 tags), or could be directly input by the user.

For those who wish to submit their music on a "voluntary" basis directly to the recognition server, e.g., as the result of an incentive, such as sales commission, etc, the above process would simply upload the constellation or raw parameters independently of any other service. This would be particularly useful for obscure material, such as dance music, deleted items, etc.

One possible way to accomplish this is by building an interface to a predetermined web site via which fingerprints could be obtained through scanning either a CD or digital file. In this case, duplication of fingerprints would be avoided by quickly comparing the new fingerprint against the existing database. In addition, such an approach would likely not violate copyright laws.

Another possible embodiment includes a CD player/ripper device or program with a built-in constellation extractor. One could rip a CD in terms of constellations in about 20-30 seconds. This could happen in the background when nobody is paying attention. The constellation coefficients could be sent to the recognition server to build up the database. As previously noted, this amount of data would be relatively small. Such a ripping program could of course send ID3 tags along with the constellation data.

Thus far, the discussion has related to the embodiments in which the constellation extraction occurs on the user end side. It is also plausible to assume that this extraction could be done by other constituencies such as:

the record label (with every new release);
the artist (when composing a new song); and
retail store (when a new album is put on the shelf).

Each of the constituencies mentioned above would probably have an incentive to add the media file to the recognition database (e.g., selling more music). Moreover, the recognition service could provide incentives to these constituencies to voluntarily supply this information to the recognition service in the way of directed sales, commissions, etc.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific data formats and protocols, any formats or protocols may suffice. Moreover, while some of the embodiments describe specific embodiments of computer, clients, servers, etc., other types may be employed by the invention described herein. Furthermore, these examples should not be interpreted to limit the modifications and variations of the invention covered by the claims but are merely illustrative of possible variations.

The database heretofore discussed is envisioned as being particularly useful as part of a media recognition system. As such, a method and apparatus for identifying media, in a number of contexts, is herein disclosed.

The disclosed invention is capable of recognizing an exogenous sound signal that is a rendition of a known recording indexed in a database. The exogenous sound signal may be subjected to distortion and interference, including background noise, talking voices, compression artifacts, band-limited filtering, transmission dropouts, time warping, and other linear and nonlinear corruptions of the original signal. The algorithm is capable of identifying the corresponding original recording from a large database of recordings in time proportional to the logarithm of the number of entries in the database. Given sufficient computational power the system can perform the identification in nearly real-time, i.e. as the sound is being sampled, with a small lag.

Database Construction

The sound database may consist of any collection of recordings, such as speech, music, advertisements, or sonar signatures.

Indexing

In order to index the sound database, each recording in the library is subjected to landmarking and fingerprinting analysis to generate index set for each item. Each recording in the database has a unique index, sound.sub.13 ID.

Landmarking

Each sound recording is landmarked using methods to find distinctive and reproducible locations within the sound recording. The ideal landmarking algorithm will be able to mark the same points within a sound recording despite the presence of noise and other linear and nonlinear distortion. The landmarking method is conceptually independent of the fingerprinting process, but may be chosen to optimize performance of the latter. Landmarking results in a list of timepoints {landmark.sub.k} within the sound recording at which fingerprints should be calculated. A good landmarking scheme marks about 5-10 landmarks per second of sound recording, of course depending on the amount of activity within the sound recording.

Power Norms

A simple landmarking technique is to calculate the instantaneous power at every timepoint and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal.

Spectral Lp Norms

The power norm method of landmarking is especially good for finding transients in the sound signal. The power norm is actually a special case of the more general Spectral Lp Norm, where p=2. The general Spectral Lp Noun is calculated at each time along the sound signal by calculating the spectrum, for example via a Hanning-windowed Fast Fourier Transform (FFT). The Lp norm for that time slice is then calculated as the sum of the p-th power of the absolute values of the spectral components, optionally followed by taking the p-th root. As before, the landmarks are chosen as the local maxima of the resulting values over time.

Multislice Landmarks

Multislice landmarks may be calculated by taking the sum of p-th powers of absolute values of spectral components over multiple timeslices instead of a single slice. Finding the local maxima of this extended sum allows optimization of placement of the multislice fingerprints, described below.

Fingerprinting

The algorithm computes a fingerprint at each landmark timepoint in the recording. The fingerprint is generally a value or set of values that summarize a set of features in the recording near the timepoint. In our implementation the fingerprint is a single numerical value that is a hashed function of multiple features.

The following are a few possible fingerprint categories.

Salient Spectral Fingerprints

In the neighborhood of each landmark timepoint a frequency analysis is performed to extract the top several spectral peaks. A simple such fingerprint value is just the single frequency value of the strongest spectral peak. The use of such a simple peak resulted in surprisingly good recognition in the presence of noise, but resulted in many false positive matches due to the non-uniqueness of such a simple scheme. Using fingerprints consisting of the two or three strongest spectral peaks resulted in fewer false positives, but in some cases created a susceptibility to noise if the second-strongest spectral peak was not sufficiently strong enough to distinguish it from its competitors in the presence of noise—the calculated fingerprint value would not be sufficiently stable. Despite this, the performance of this case was also good.

Multislice Fingerprints

In order to take advantage of the time-evolution of many sounds a set of timeslices is determined by adding a set of offsets to a landmark timepoint. At each resulting timeslice a Salient Spectral Fingerprint is calculated. The resulting set of fingerprint information is then combined to form one multitone fingerprint. Each such fingerprint is much more unique than the single-time salient spectral fingerprint since it tracks temporal evolution, resulting in fewer false matches. Our experiments indicate that using two or three timeslices along with the single strongest spectral peak in each timeslice results in very good performance, even in the presence of significant noise.

LPC Coefficients

In addition to finding the strongest spectral components, there are other spectral features that can be extracted and used as fingerprints. LPC analysis extracts the linearly predictable features of a signal, such as spectral peaks, as well as spectral shape. LPC coefficients of waveform slices anchored at landmark positions can be used as fingerprints by hashing the quantized LPC coefficients into an index value. LPC is well-known in the art of digital signal processing.

Cepstral Coefficients

Characterize signals that are harmonic, such as voices or many musical instruments. A number of cepstral coefficients may hashed together into an index and used as a fingerprint. Cepstral analysis is well-known in the art of digital signal processing.

Index Set

The resulting index set for a given sound recording is a list of pairs (fingerprint, landmark) of analyzed values. Since the index set is composed simply of pairs of values, it is possible to use multiple landmarking and fingerprinting schemes simultaneously. For example, one landmarking/fingerprinting scheme may be good at detecting unique tonal patterns, but poor at identifying percussion, whereas a different algorithm may have the opposite attributes. Use of multiple landmarking/fingerprinting strategies results in a more robust and richer range of recognition percussion. Different fingerprinting techniques may be used together by reserving certain ranges of fingerprint values for certain kinds of fingerprints. For example, in a 32-bit fingerprint value, the first 3 bits may be used to specify which of 8 fingerprinting schemes the following 29 bits are encoding.

Searchable Database

Once the index sets have been processed for each sound recording in the database, a searchable database is constructed in such a way as to allow fast (logtime) searching. This is accomplished by constructing a list of triplets (fingerprint, landmark, sound ID), obtained by appending the corresponding sound.sub.13 ID to each doublet from each index set. All such triplets for all sound recordings are collected into a large index list. In order to optimize the search process, the list of triplets is then sorted according to the fingerprint. Fast sorting algorithms are well-known in the art and extensively discussed in D. E. Knuth. "The Art of Computer Programing, Volume 3: Sorting and Searching." hereby incorporated by reference. High-performance sorting algorithms can sort the list in N log(N) time, where N is the number of entries in the list. Once this list is sorted it is further processed by segmenting it such that each unique fingerprint in the list is collected into a new master index list. Each entry in this master index list contains a fingerprint value and a pointer to a list of (landmark, sound.sub.13 ID) pairs. Rearranging the index list in this way is optional, but save memory since each fingerprint value only appears once. It also speeds up the database search since the effective number of entries in the list is greatly reduced to a list of unique values.

Alternatively, the master index list could also be constructed by inserting each triplet into a B-tree with non-unique fingerprints hanging off a linked list. Other possibilities exist for constructing the master index list. The master index list is preferably held in system memory, such as DRAM, for fast access.

Recognition System

Once the master index list has been built it is possible to perform sound recognition over the database.

Sound Source

Exogenous sound is provided from any number of analog or digital sources, such as a stereo system, television, Compact Disc player, radio broadcast, telephone, mobile phone, internet stream, or computer file. The sounds may be realtime or offline. They may be from any kind of environment, such as a disco, pub, submarine, answering machine, sound file, stereo, radio broadcast, or tape recorder. Noise maybe present in the sound signal, for example in the form of background noise, talking voices, etc.

Input to the Recognition System

The sound stream is then captured into the recognition system either in realtime or presented offline, as with a sound file. Real-time sounds may be sampled digitally and sent to the system by a sampling device such as a microphone, or be stored in a storage device such as an answering machine, computer file, tape recorder, telephone, mobile phone, radio, etc. The sound signal may be subjected to further degradation due to limitations of the channel or sound capture device. Sounds may also be sent to the recognition system via an internet stream, FOP, or as a file attachment to email.

Preprocessing

Once the sound signal has been converted into digital form it is processed for recognition. As with the construction of the master index list, landmarks and fingerprints are calculated. In fact, it is advisable to use the very same code that was used for processing the sound recording library to do the landmarking and fingerprinting of the exogenous sound input. The resulting index set for exogenous sound sample is also a list of pairs (fingerprint, landmark) of analyzed values.

Searching

Searching is carried out as follows: each fingerprint/landmark pair (fingerprints, landmarks) in the resulting input sound's index set is processed by searching for fingerprint$_k$ in the master index list. Fast searching algorithms on an ordered list are well-known in the art and extensively discussed in Knuth. Volume 3 (ibid.), incorporated by reference. If fingerprints is found then the corresponding list of matching (landmark*$_i$.sound$_{13}$ ID$_j$) pairs having the same fingerprint is copied and augmented with landmark to form a set of triplets of the form (landmark$_k$.landmark*$_i$.sound ID$_j$). This process is repeated for all k ranging over the input sound's index set, with the all the resulting triplets being collected into a large candidate list.

After the candidate list is compiled it is further processed by segmenting according to sound$_{13}$ ID. A convenient way of doing this is to sort the candidate list according to sound$_{13}$ ID, or by insertion into a B-tree. The result of this is a list of candidate sound IDs, each of which having a scatter list of pairs of landmark timepoints, (landmark$_k$.landmark*$_j$) with the sound$_{13}$ ID stripped off.

Scanning

The scatter list for each sound$_{13}$ ID is analyzed to determine whether it is a likely match.

Thresholding

One way to eliminate a large member of candidates is to toss out those having a small scatter list. Clearly, those having only 1 entry in their scatter lists cannot be matched.

Alignment

A key insight into the matching process is that the time evolution in matching sounds must follow a linear correspondence, assuming that the timebases on both sides are steady. This is almost always true unless the sound on one side has been nonlinearly warped intentionally or subject to defective playback equipment such as a tape deck with a warbling speed problem. Thus, the matching fingerprints yielding correct landmark pairs (landmark$_n$.landmark*$_n$) in the scatter list of a given sound$_{13}$ ID must have a linear correspondence of the form $$\text{landmark*}_n = m * \text{landmark}_n + \text{Offset}$$

where m is the slope, and should be near 1, landmark$_n$ is the corresponding timepoint within the exogenous sound signal, landmark*$_n$ is the corresponding timepoint within the library sound recording indexed by sound$_{13}$ ID, and offset is the time offset into the library sound recording corresponding to the beginning of the exogenous sound signal.

This relationship ties together the true landmark/fingerprint correspondences between the exogenous sound signal and the correct library sound recording with high probability, and excludes outlier landmark pairs. Thus, the problem of determining whether there is a match is reduced to finding a diagonal line with slope near 1 within the scatterplot of the points in the scatter list.

There are many ways of finding the diagonal line. A preferred method starts by subtracting m*landmark$_n$ from both sides of the above equation.

$$(\text{landmark*}_n - m*\text{landmark}_n) = \text{offset}$$

Assuming that m is approximately 1. we arrive at $$(\text{landmark}_n - \text{landmark}_n) = \text{offset}$$

The diagonal-finding problem is then reduced to finding multiple landmark pairs that cluster near the same offset value. This is accomplished easily by calculating a histogram of the resulting offset values and searching for the offset bin with the highest number of points. Since the offset must be positive if the exogenous sound signal is fully contained within the correct library sound recording, landmark pairs that result in a negative offset are excluded.

The winning offset bin of the histogram is noted for each qualifying sound$_{13}$ ID, and the corresponding score is the number of points in the winning bin. The sound recording in the candidate list with the highest score is chosen as the winner. The winning sound$_{13}$ ID is provided to an output means to signal the success of the identification.

To prevent false identification, a minimum threshold score may be used to rate the success of the identification process. If no library sound recording meets the minimum threshold then there is no identification.

Pipelined Recognition

In a real-time system the sound is provided to the recognition system incrementally over time. In this case it is possible to process the data in chunks and to update the index set incrementally. Each update period the newly augmented index set is used as above to retrieve candidate library sound recordings using the searching and scanning steps above. The advantage of this approach is that if sufficient data has been collected to identify the sound recording unambiguously then the data acquisition may be terminated and the result may be announced.

Reporting the Result

Once the correct sound has been identified, the result is reported. Among the result-reporting means, this may be done using a computer printout, email, SMS text messaging to a mobile phone, computer-generated voice annotation over a telephone, posting of the result to an internet account which the user can access later.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific data formats and protocols, any formats or protocols may suffice. Moreover, while some of the embodiments describe specific embodiments of computer. client servers, etc., other types may be employed by the invention described herein. Furthermore, these examples should not be interpreted to limit the modifications arid variations of the invention covered by the claims but are merely illustrative of possible variations.

What is claimed is:

1. A method for creating a database comprising fingerprint and landmark pairs associated with content samples, the method comprising the steps of:
   extracting a plurality of characteristics from a content sample;
   transferring said plurality of characteristics to a server coupled with a database;
   deriving fingerprint and landmark pairs from said characteristics, wherein landmarks from said fingerprint and landmark pairs are reproducible selected points in a segment of the content, and wherein fingerprints are values calculable from said characteristics of said content sample at their associated landmarks; and
   storing said fingerprint and landmark pairs in said database.

2. The method of claim 1 further comprising the step of:
   simultaneously transferring metadata used to identify said content sample when transferring said plurality of characteristics.

3. The method of claim 2 further comprising the step of:
   associating said metadata used to identify said content sample with said stored fingerprint and landmark pairs.

4. The method of claim 1 wherein said processing is executed by an updateable or replaceable algorithm.

5. The method of claim 1 further comprising the step of:
   prior to extracting said characteristics, determining whether or not said database already contains landmark and fingerprint pairs associated with said content sample.

6. The method of claim 1 where said content comprises content stored on a compact disk or digital video disk.

7. The method of claim 1 where said content comprises a streaming content.

8. The method of claim 1 where said content comprises a file stored on a user's computer.

9. The method of claim 1 wherein said processing said characteristics into fingerprint and landmark pairs comprises the steps of:
   compiling a list of distinctive and reproducible points in time at which fingerprints should be calculated; and
   calculating one or more fingerprints at one or more said distinctive and reproducible points in time.

10. The method of claim 1 wherein said characteristics are a member of the group comprising:
    a frequency value of the strongest spectral peak in proximity to a landmark,
    a plurality of frequency values of the strongest spectral peaks in proximity to a landmark,
    LPC coefficients,
    Cepstral Coefficients,
    a single value that is a hashed function of multiple characteristics.

11. The method of claim 9 wherein said compiling a list of distinctive and reproducible points in time at which fingerprints should be calculated comprises calculating the instantaneous power at said points in rime and selecting a power maxima within those points in time.

12. The method of claim 9 wherein said compiling a list of distinctive and reproducible points in time at which fingerprints should be calculated comprises calculating the absolute value of one or more spectral components at said points in time and finding the local maxima of said absolute value.

13. The method of claim 1 wherein said extracting is accomplished using a data archiving service.

14. The method of claim 1 wherein said extracted characteristics are associated with metadata from a content file.

15. The method of claim 14 wherein
    said extracted characteristics are used to look up said metadata in a metadata database.

16. The method of claim 1 further comprising:
    creating an index of fingerprint and landmark pairs associated with said content samples and sorting said index according to fingerprint.

17. An apparatus comprising a database of fingerprint and landmark pairs associated with content samples, said database comprising:
    a plurality of stored fingerprint and landmark pairs, where said fingerprint and landmark pairs are constructed by:
    extracting a plurality of characteristics from a content sample;
    transferring said plurality of characteristics to a server coupled with a database; and
    deriving fingerprint and landmark pairs from said characteristics, wherein landmarks from said fingerprint and landmark pairs are reproducible selected points in a segment of the content, and wherein fingerprints are values calculable from said characteristics of said content sample at their associated landmarks.

18. The apparatus of claim 17 where said database further comprises:
    metadata used to identify said content sample associated with said stored fingerprint and landmark pairs.

19. The apparatus of claim 17 wherein said processing is executed by an updateable or replaceable algorithm.

20. The apparatus of claim 17 where said fingerprint and landmark pairs are further constructed by:
    prior to extracting said characteristics, determining whether or not said database already contains landmark and fingerprint pairs associated with said content sample.

21. The apparatus of claim 17 where said content comprises content stored on a compact disk or digital video disk.

22. The apparatus of claim 17 where said content comprises a streaming content.

23. The apparatus of claim 17 where said content comprises a tile stored on a user's computer.

24. The apparatus of claim 17 wherein said processing said characteristics into fingerprint and landmark pairs comprises the steps of:
    compiling a list of distinctive and reproducible points in time at which fingerprints should be calculated; and
    calculating one or more fingerprint at one or more said distinctive and reproducible points in time.

25. The apparatus of claim 17 wherein said characteristics are a member of the group comprising:
   a frequency value of the strongest spectral peak in proximity to a landmark,
   a plurality of frequency values of the strongest spectral peaks in proximity to a landmark,
   LPC Coefficients,
   Cepstral Coefficients,
   a single value that is a hashed function of multiple characteristics.

26. The apparatus of claim 24 wherein said compiling a list of distinctive and reproducible points in time at which fingerprints should be calculated comprises calculating the instantaneous power at said points in time and selecting a power maxima within those points in time.

27. The apparatus of claim 24 wherein said compiling a list of distinctive and reproducible points in time at which fingerprints should be calculated comprises calculating the absolute value of one or more spectral components at said points in time and finding the local maxima of said absolute value.

28. The apparatus of claim 17 wherein said extracting is accomplished using a data archiving service.

29. The apparatus of claim 17 wherein said extracted characteristics are associated with metadata from a content file.

30. The apparatus of claim 29 wherein
   said extracted characteristics are used to look up said metadata in a metadata database.

31. The apparatus of claim 17 where said database further comprises:
   an index of fingerprint and landmark pairs associated with said content samples, said index sorted according to fingerprint.

32. A method of creating a database of fingerprint and landmark pairs associated with an music sample comprising the steps of:
   playing a music sample to be identified;
   determining that the music sample is missing from said database;
   extracting one or more of characteristics from the music sample, where said characteristic, are common to distinctive and reproducible points in time within said music sample;
   transferring said plurality of characteristics to a server coupled with a database;
   deriving fingerprint and landmark pairs from said characteristics using an updateable or replaceable algorithm, wherein landmarks from said fingerprint and landmark pairs are reproducible selected points in a segment of the content, and wherein fingerprints are values calculable from said characteristics of said content sample at their associated landmarks;
   storing said fingerprint and landmark pairs in said database; and
   indexing said fingerprint and landmark pairs associated with said music samples, according to fingerprint.

33. The method of claim 32 further comprising, when fingerprint and landmark pairs associated with said music sample are already contained in the database;
   determining whether or not said characteristics were processed with a most recent version of said updateable or replaceable algorithm;
   updating said version of said updateable or replaceable algorithm, when it is determined that said characteristics were processed with an old version, and processing said characteristics with said most recent version of said algorithm.

* * * * *

UNITED STATES PATENT AND TRADEMARK OFFICE
CERTIFICATE OF CORRECTION

PATENT NO. : 7,359,889 B2
APPLICATION NO. : 10/087204
DATED : April 15, 2008
INVENTOR(S) : Avery Li-Chun Wang et al.

It is certified that error appears in the above-identified patent and that said Letters Patent is hereby corrected as shown below:

Column 7, Line 20, delete the text "Lp Noun" and replace with --Lp Norm--.

Column 8, Line 42, delete the text "sound ID)" and replace with --sound_ID)--.

Column 9, Line 24, delete the text ". FOP," and replace with --, FTP,--.

Column 9, Line 45, delete the text "(landmark*.sub.i.sound.sub.13 ID.sub.j)" and replace with --(landmark*.sub.j, sound.sub.13 ID.sub.j)--, Column 9, Line 48, delete text "(landmark.sub.k.landmark*.sub.i.sound ID.sub.j)" and replace with --(landmark.sub.k, landmark*.sub.j, sound_ID.sub.j)--.

Column 9, Line 56, delete the text "sound IDs" and replace with --sound_IDs--.

Column 9, Line 58, delete text "(landmark.sub.k.landmark*.sub.j)" and replace with --(landmark.sub.k, landmark*.sub.j)--.

Column 9, Line 65, delete text "member" and replace with --number--.

Column 10, Lines 9-10, delete the text "(landmark.sub.n.landmark*.sub.n)" and replace with --(landmark.sub.n, landmark*.sub.n)--.

Column 12, Claim 11, line 8, delete the text "rime" and replace with --time--.

Signed and Sealed this

Fifteenth Day of July, 2008

JON W. DUDAS
*Director of the United States Patent and Trademark Office*